No. 856,009. PATENTED JUNE 4, 1907.
J. E. WHEATON.
HARROW.
APPLICATION FILED SEPT. 22, 1906.
2 SHEETS—SHEET 1.
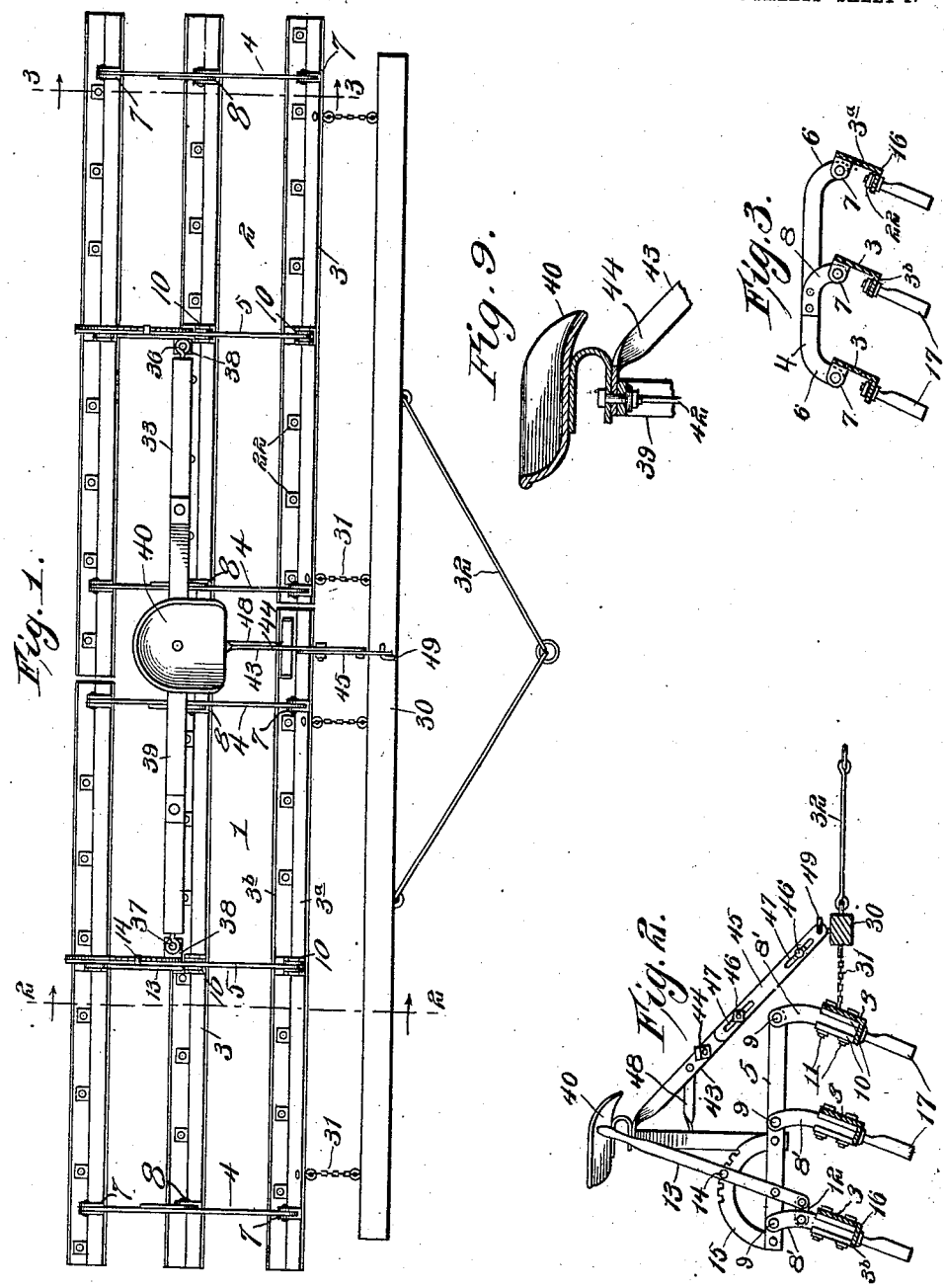
Witnesses
Inventor
John E. Wheaton
By Victor J. Evans
Attorney

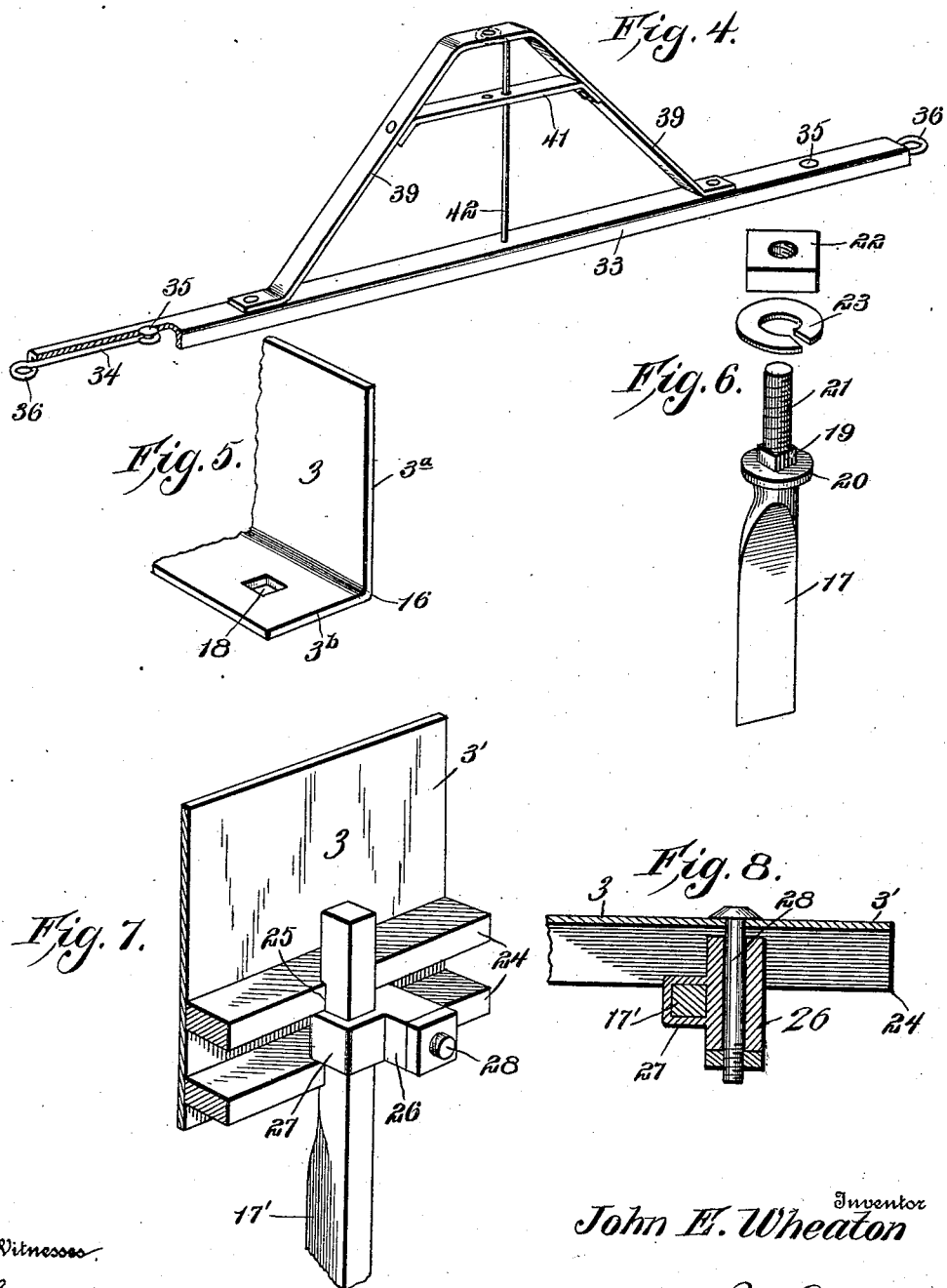

UNITED STATES PATENT OFFICE.

JOHN E. WHEATON, OF GENESEO, ILLINOIS.

HARROW.

No. 856,009.  Specification of Letters Patent.  Patented June 4, 1907.

Application filed September 22, 1906. Serial No. 335,755.

*To all whom it may concern:*

Be it known that I, JOHN E. WHEATON, a citizen of the United States of America, residing at Geneseo, in the county of Henry and State of Illinois, have invented new and useful Improvements in Harrows, of which the following is a specification.

This invention relates to improvements in harrows, and particularly to those of the drag type and composed of two or more sections, one of the objects of the invention being to provide an improved construction in which the drag bars will act effectively in conjunction with the teeth to thoroughly break up and pulverize the soil.

Another object is to provide an improved construction of drag bar and means for mounting the harrow teeth thereon, as well as improved means for connecting and adjusting the bars whereby the teeth and bars may be set at a desired working angle.

Another object is to provide a construction of harrow in which the adjacent ends of the harrow sections break joint or overlap, so that the intervening space will be covered by the bars and teeth, thus adapting the harrow to operate upon the soil without break along the length thereof.

A still further object is to provide an improved construction of seat support and means for holding the same in operative position, said support being readily removable to render the implement capable for use as a walking or riding harrow at will.

With the above and other objects in view, the invention consists of the novel construction, combination and arrangement of parts hereinafter fully described and claimed, reference being had to the accompanying drawings, in which:—

Figure 1 is a top plan view of a harrow constructed in accordance with my invention. Figs. 2 and 3 are front to rear sections on the lines 2—2 and 3—3 of Fig. 1. Fig. 4 is a perspective view, partly broken away, of the seat support. Fig. 5 is a detail view in fragmentary perspective of one of the drag bars. Fig. 6 is a detail view of one of the harrow teeth and the means for fastening the same to the drag bar. Fig. 7 is a view showing a modified construction of drag bar and harrow teeth and fastening therefor. Fig. 8 is a horizontal section through the same. Fig. 9 is a detail section through the seat and upper connecting portions of its supports.

Referring to the drawings, 1 and 2 designate the harrow sections, each of which comprises a series of drag bars 3, preferably three in number, the drag bars of the two sections being arranged in longitudinal alinement. The drag bars of each section are connected and held in assembled relation by superposed links 4 and 5. The links 4 connect the bars adjacent their ends, said links having downturned front and rear ends 6 pivotally connected with ears 7 on the front and rear drag bars. Each of said links is provided with a bracket piece 8 bolted or riveted thereto and having a downturned end pivotally connected with a similar ear on the intermediate drag bar. This construction and mode of supporting the drag bars from the links permits said bars to be swung freely to adjust them and the teeth carried thereby to any desired working angle within their range of adjustment.

The central link 5 is connected with the drag bars in a different manner, the bars being suspended therefrom by curved hanger arms 8' pivoted at their upper ends to the links, as indicated at 9, and engaged at their lower ends by clips 10 through which and the arms pass bolts or rivets connecting the same with the drag bar. The rear arm 8' is connected by a short link 12 with an adjusting lever 13 pivoted to the supporting link 5, which lever is provided with a pawl or dog 14 arranged to engage notches in a rack 15 fixed to said supporting link. The notches are so arranged that when the lever is in normal or intermediate position, the drag bars and teeth will be held at the proper normal working angle, at such a rearward inclination as to adapt such parts to work the most effectively on the soil while permitting of the passage of weeds and other trash between and beneath the teeth.

Each drag bar is preferably formed of angle iron or steel, and as shown in the present instance is L-shaped, the longer web 3ª thereof being arranged vertically and the shorter web 3ᵇ horizontally and extending rearwardly from the lower edge of said vertical web. By this construction and arrangement the web 3ª forms a shield or barrier to prevent the loosened earth from working upward over the bar and throws it downward in advance of the teeth, while the web $3^b$ forms a support for the teeth, and a breaking angle 16 is provided at the lower forward corner of the bar to thoroughly crush all clods as the bar drags over the soil.

It will be observed that the alined drag bars of the two sections 1 and 2 are of relatively different lengths, and that such arrangement alternates from front to rear through the series of bars, so that the front, rear and intermediate bars are caused to break joint or overlap at the inner or meeting ends of the sections, thus enabling the teeth of the bars to be so arranged as to work upon all portions of the earth within the area of the harrow. By this means the portion of earth between the harrow sections usually left unworked by the wide separation of the teeth between said sections will be thoroughly worked, thus uniformly harrowing the ground.

The harrow teeth 17 are arranged upon the drag bars at desired intervals apart, and each tooth is firmly and yet detachably fastened to the bar, so that it may be conveniently removed when broken or injured and a new tooth as conveniently substituted in its place. As shown, each tooth 17 is provided with an upwardly extending shank to pass upwardly through an opening 18 formed in the web $3^b$ of the bar. The opening 18 is of angular form to snugly receive an angular portion 19 of the shank, whereby the tooth when applied will be held from rotation. A head 20 is formed on the shank to bear against the under side of the web $3^b$ and hold the tooth from upward movement, and the upper portion of the shank is rounded and threaded, as at 21, for the reception of a clamping nut 22 which fastens the tooth against downward movement, a split spring washer 23 being preferably arranged between the nut and web to insure a tight connection and prevent the nut from working loose. This construction permits the teeth to be readily applied and removed, as will be readily understood.

In Figs. 7 and 8 I have shown a modification in the structure of bar and teeth and means for securing the latter in position, the bar 3' in this embodiment comprising a metallic plate formed or provided upon its rear side with spaced longitudinal ribs 24, while the tooth 17' has its shank formed with a recess 25 to receive said ribs and to produce shoulders engaging the ribs and holding the tooth from vertical movement. A fastening bracket 26 is provided with a strap 27 engaging the reduced portion of the shank and projects partially between the ribs, said bracket having a bore for the passage of a bolt 28 extending through the plate and provided with a securing nut whereby the bracket is fastened in position to secure the tooth against longitudinal movement on the bar. This construction also enables the tooth to be applied and removed with facility. The teeth are preferably comparatively short in length and are designed to fully enter the earth, allowing the bars to drag over the surface thereof, by which the teeth will cut up the soil while the bars will break up all lumpy particles and reduce the loosened soil to a thoroughly pulverized condition.

A draw bar 30 is arranged at the front of the harrow in the usual manner and is suitably connected therewith, as by chains 31, said bar being provided with a suitable draft connection 32 for the attachment of the draft animals.

The seat supporting means comprises a channeled supporting beam 33 provided at its ends with coupling devices 34, each consisting of a rod mainly inclosed within the channel of the beam, said rod being provided at its inner end with an eye to engage a fastening stud 35 on the beam and at its outer end with an eye 36 projecting beyond the beam adapted to engage a supporting pin or projection 37 carried by a bracket piece 38, the bracket pieces being secured to or formed upon the intermediate links 5 of the harrow sections. These links 5 are connected with the drag bars by the depending arms 8' in order to be arranged at a higher elevation than the inner end links 4, so that the supported beam 33 may extend over said links 4, as shown in Fig. 1. A substantially inverted V-shaped bracket 39 rises from the beam and has its vertex portion flattened to form a rest for the seat 40 which is suitably fastened thereto. The free or divergent ends of this bracket are bolted or riveted to the beam, and braces 41 and 42 are provided to stay the bracket, the brace 41 being arranged to connect the bracket arms, while the brace 42 extends vertically between and connects the seat supporting portion of the bracket with the beam 33.

In order to secure the seat support in position, a brace or truss rod or bar 43 is provided to connect the same with the draw bar 30. This brace comprises two sections 44 and 45 arranged to overlap and slidably connected by bolts 46 on one section adjustable in longitudinal slots 47 in the other section, whereby the brace may be adjusted as to length to suit the different arrangement of the parts and to compensate for differences in the distance between the seat support and draw bar. The upper end of the section 44 may be secured to the crown of the brace 39 in any preferred manner, as by a post or stem projecting from the seat downward through openings in said crown portion and the brace 41, which stem may also serve to secure to said brace 41 a supplemental brace 48 extending from the part 44. The lower end of section 45 is apertured to engage a hook 49 on the draft bar. By this construction the seat and its support may be firmly held in position, while upon disconnecting the brace 43 from the bracket 39 and unhooking it from the bar 30, the support may be detached from the harrow by lifting the beam so as to withdraw the eyes 36 from engagement with the holding pins 37, thus permitting the seat and its support to be removed whenever it is desired to convert the implement into a walking harrow.

Having thus described the invention, what is claimed as new, is:—

1. A harrow comprising a plurality of angular bars, each presenting vertical and horizontal webs, end and intermediate links pivotally connected to the vertical webs, harrow teeth supported by the horizontal webs, and means associated with the intermediate link for adjusting the bars to set at different angles.

2. A harrow comprising a plurality of drag bars of angular form, each presenting vertical and horizontal webs, the vertical web being longer than the horizontal web to form an earth-barrier, and the horizontal web extending rearwardly from the lower edge of the vertical web, whereby the corner angle of said webs is disposed to form a breaking surface at the lower front portion of the bar, links arranged above the bars, means pendent from the links and pivotally connecting the vertical webs therewith, harrow teeth supported by the horizontal webs and adapted to penetrate fully into the soil to bring the breaking angles of the bars into contact therewith, and means associated with one of said links for adjusting the bars to set at different angles.

3. A harrow comprising a plurality of parallel bars corresponding in construction and in the relative arrangement of the parts thereof, said bars being of angular form, each presenting a vertical and a horizontal web, the vertical web being longer than the horizontal web to form an earth-barrier, and the horizontal web extending rearwardly from the lower edge of the vertical web, whereby the corner angle of said webs is disposed to form a breaking surface at the lower front portion of the bar, links arranged above the bars, harrow teeth supported by the horizontal webs and adapted to penetrate fully into the soil to bring the breaking angles of the bars into contact therewith, links arranged above the bars, means pendent from the links and pivotally connecting the vertical webs of the bars therewith, and means for simultaneously adjusting said bars.

4. A harrow comprising a plurality of angular bars, each presenting vertical and horizontal webs, the vertical webs being provided with lugs, harrow teeth supported by the horizontal webs, links having down-turned portions pivoted to the lugs, and means for adjusting the bars to set at different working angles.

5. A harrow comprising a plurality of drag bars, harrow teeth supported by the bars, end links having down-turned portions pivotally connected with the bars, an intermediate link, hangers pivoted to the intermediate link and attached to the bars, and means associated with the intermediate link for adjusting the bars to set at different angles.

6. A harrow comprising a plurality of angular drag bars, each presenting vertical and horizontal webs, harrow teeth carried by the horizontal webs, end links having down-turned portions pivotally connected with the vertical webs, an intermediate link, brackets pivoted to the intermediate link and secured to the vertical webs, and means associated with the intermediate link for adjusting the bars to set at different angles.

7. A harrow comprising a plurality of angular drag bars, each presenting vertical and horizontal webs, the former being provided with lugs, end links having downturned portions pivotally connected with the lugs, harrow teeth supported by the horizontal webs, an intermediate link, hangers pivoted to the intermediate link and depending therefrom and secured to the vertical webs, and means associated with the intermediate link for adjusting the bars to set at different angles.

8. A harrow comprising a plurality of angular drag bars, each presenting vertical and horizontal webs, harrow teeth supported by the horizontal webs, end links directly pivoted to the vertical webs, an intermediate link indirectly pivoted to the vertical webs, and means associated with the intermediate link for adjusting the bars to set at different angles.

9. A harrow comprising a plurality of L-shaped drag bars, each presenting vertical and horizontal webs, the vertical webs being longer than the horizontal webs and having the latter extending rearwardly from the lower edges thereof, teeth supported by the horizontal webs, the corner angles of the webs being arranged to provide breaking surfaces at the lower front portions of the bars to coöperate with the teeth, end links directly pivoted to the vertical webs, an intermediate link indirectly pivoted to the vertical webs, and means associated with the intermediate link for adjusting the bars to set at different angles.

10. A harrow comprising a plurality of angular drag bars, each presenting vertical and horizontal webs, the latter extending rearwardly from the lower edges of the former, lugs upon the vertical webs, end links having down-turned portions pivoted to said lugs, an intermediate link, hangers depending from and pivoted to said link, clips engaging the lower ends of the hangers and securing the same to the vertical webs, and means associated with the intermediate link for adjusting the bars to set at different angles.

In testimony whereof, I affix my signature in presence of two witnesses.

JOHN E. WHEATON.

Witnesses:
    E. S. Wochs,
    Jno. P. Stewart.